US008650972B2

(12) United States Patent
Kitamura et al.

(10) Patent No.: US 8,650,972 B2
(45) Date of Patent: Feb. 18, 2014

(54) SENSOR APPARATUS FOR A BICYCLE HUB

(75) Inventors: Satoshi Kitamura, Kitakatsuragi-gun (JP); Michihiro Kodama, Osaka (JP)

(73) Assignee: Shimano, Inc., Sakai (JP)

( * ) Notice: Subject to any disclaimer, the term of this patent is extended or adjusted under 35 U.S.C. 154(b) by 523 days.

(21) Appl. No.: 13/151,588

(22) Filed: Jun. 2, 2011

(65) Prior Publication Data
US 2012/0304783 A1 Dec. 6, 2012

(51) Int. Cl.
*G01L 5/12* (2006.01)

(52) U.S. Cl.
USPC ...................................................... 73/862.49

(58) Field of Classification Search
USPC ...................................................... 73/862.49
See application file for complete search history.

(56) References Cited

U.S. PATENT DOCUMENTS

| 4,966,380 | A | * | 10/1990 | Mercat | 280/259 |
| 5,031,455 | A | * | 7/1991 | Cline | 73/379.01 |
| 5,065,633 | A | | 11/1991 | Mercat | |
| 6,409,197 | B1 | | 6/2002 | Endo et al. | |
| 6,418,797 | B1 | | 7/2002 | Ambrosina et al. | |
| 6,992,413 | B2 | | 1/2006 | Endo et al. | |
| 7,516,677 | B2 | * | 4/2009 | Watarai et al. | 73/862.321 |
| 7,585,258 | B2 | * | 9/2009 | Watson et al. | 482/63 |
| 2005/0275561 | A1 | | 12/2005 | Kolda et al. | |
| 2005/0285461 | A1 | | 12/2005 | Kitamura et al. | |
| 2007/0240519 | A1 | | 10/2007 | Shimazu et al. | |

FOREIGN PATENT DOCUMENTS

| EP | 0343022 A1 | 11/1989 |
| FR | 2794684 A1 | 12/2000 |
| JP | 09-301262 A | 11/1997 |
| JP | 2002-220079 A | 8/2002 |
| JP | 2007-255953 A | 10/2007 |

OTHER PUBLICATIONS

European Search Report for EP 12157201.0, the European application that corresponds to this application, dated Oct. 22, 2012.

* cited by examiner

*Primary Examiner* — Lisa Caputo
*Assistant Examiner* — Octavia Davis-Hollington
(74) *Attorney, Agent, or Firm* — James A. Deland

(57) ABSTRACT

A bicycle hub apparatus comprises an axle, a hub member supported for rotation around the hub axle, an intermediate drive member supported for rotation around the hub axle and having a first portion and a second portion, a sensor shaft supported for rotation around the hub axle and having a first portion and a second portion, and a force sensor unit disposed on the sensor shaft. The first portion of the intermediate drive member is structured to receive an external rotational driving force, the first portion of the sensor shaft is coupled to the second portion of the intermediate drive member to receive the rotational driving force, and the second portion of the sensor shaft is coupled to the hub member for communicating the rotational driving force to the hub member. The intermediate drive member and the sensor shaft are coupled to each other within the hub member.

56 Claims, 8 Drawing Sheets

SENSOR APPARATUS FOR A BICYCLE HUB

BACKGROUND OF THE INVENTION

The present invention is directed to bicycle wheel hubs and, more particularly, to a bicycle wheel hub with a force sensor.

Some bicycle components have sensors attached to them to measure various operating characteristics of the component. For example, transmission shift control devices may have position sensors attached to the operating cable winding mechanism in order to sense the current operating position of the operating cable winding member. The position of the operating cable winding member provides information about the current gear ratio of the bicycle transmission, and that information may be communicated to the rider through a display. In another example, a magnet may be mounted to one of the spokes of the bicycle wheel, and a sensor such as a reed switch may be mounted to the bicycle frame so that the magnet passes by the sensor upon every revolution of the wheel and the sensor produces an electrical pulse. The time between successive pulses may be used to determine the speed of the bicycle. In yet another example, a force sensor such as a strain gauge may be mounted to the surface of a component such as a pedal crank or a wheel hub in order to measure torque being applied to the component. The information from the sensor then may be used to calculate the effort exerted by the rider.

SUMMARY OF THE INVENTION

The present invention is directed to various features of a sensor apparatus for a bicycle hub. In one embodiment, a bicycle hub apparatus comprises an axle, a hub member supported for rotation around the hub axle, an intermediate drive member supported for rotation around the hub axle and having a first portion and a second portion, a sensor shaft supported for rotation around the hub axle and having a first portion and a second portion, and a force sensor unit disposed on the sensor shaft. The first portion of the intermediate drive member is structured to receive an external rotational driving force, the first portion of the sensor shaft is coupled to the second portion of the intermediate drive member to receive the rotational driving force, and the second portion of the sensor shaft is coupled to the hub member for communicating the rotational driving force to the hub member. The intermediate drive member and the sensor shaft are coupled to each other within the hub member.

In another embodiment, a bicycle hub apparatus includes an axle, a hub member supported for rotation around the hub axle, a sensor shaft supported for rotation around the hub axle, and a force sensor disposed on the sensor shaft. The sensor shaft has a first portion and a second portion, wherein the first portion of the sensor shaft is structured to receive an external rotational driving force, and the second portion of the sensor shaft is coupled to the hub member for communicating the rotational driving force to the hub member. The second portion of the sensor shaft is disposed relatively between a first flange of the hub member and a second flange of the hub member.

In another embodiment, a bicycle hub apparatus includes an axle, a hub member supported for rotation around the hub axle, a sensor shaft supported for rotation around the hub axle, and a force sensor unit disposed on the sensor shaft. The sensor shaft has a first portion and a second portion, wherein the first portion of the sensor shaft is structured to receive an external rotational driving force, and the second portion of the sensor shaft is coupled to the hub member for communicating the rotational driving force to the hub member. A dynamo is disposed within the hub member, wherein the dynamo receives rotational driving force from at least one of the sensor shaft or the hub member.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
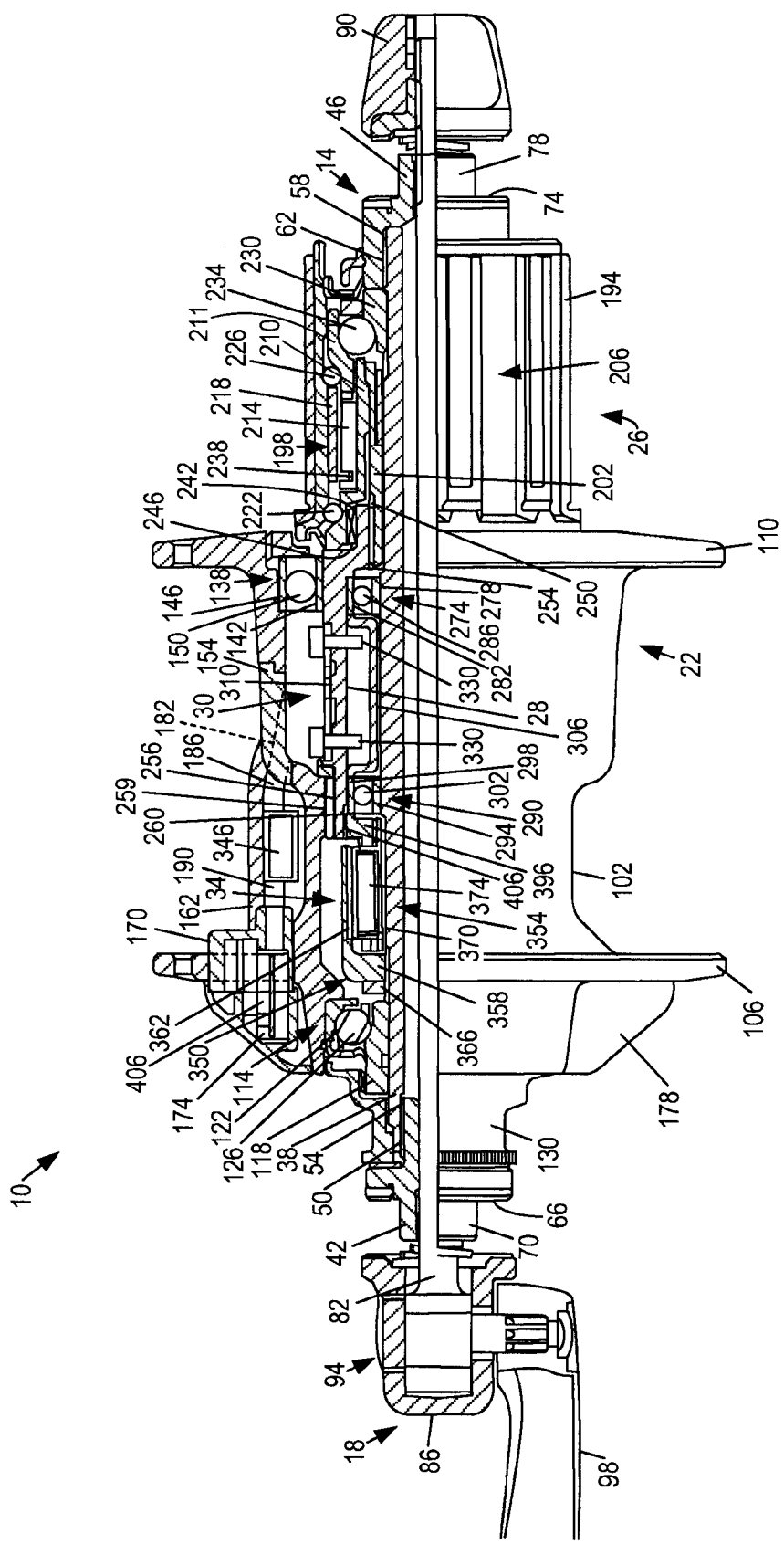
FIG. 1 is a partial cross-sectional view of an embodiment of a bicycle hub.
Figure 2:
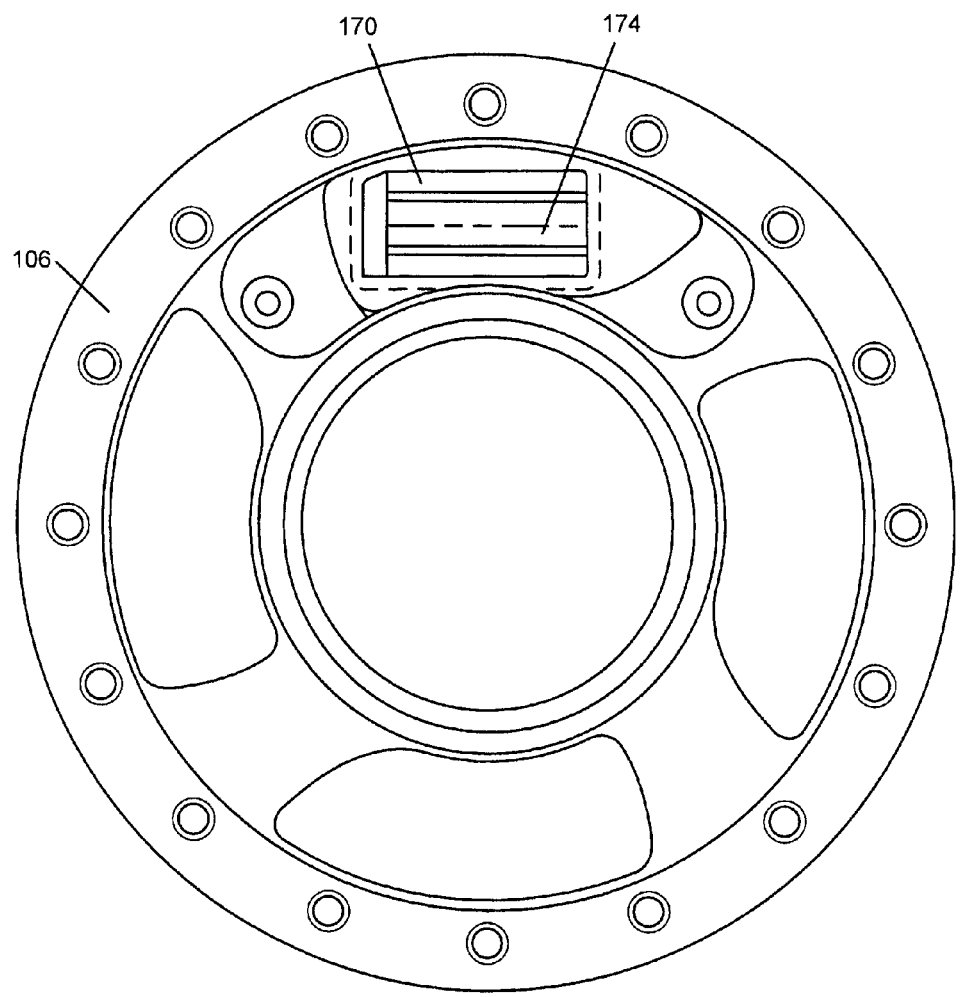
FIG. 2 is a left side view of a hub shell unit with a protective cover removed to show a circuit mounting housing and a circuit board.

FIG. 1 is a partial cross-sectional view of an embodiment of a bicycle hub 10. Bicycle hub 10 includes a hub shaft unit 14, a conventional quick-release mechanism 18 extending through hub shaft unit 14, a hub shell unit 22 rotatably supported on hub shaft unit 14, a freewheel unit 26, a sensor shaft 28 supporting a pair of force sensor units 30 (only one force sensor unit 30 is shown in FIG. 1), and a dynamo 34.

Hub shaft unit 14 includes a tubular hub shaft 38 and end caps 42 and 46. End cap 42 is attached to a first side of hub shaft 38 through an external thread 50 that engages an internal thread 54 formed on the inner peripheral surface of hub shaft 38, and end cap 46 is attached to a second side of hub shaft 38 through an internal thread 58 that engages an external thread 62 formed on the outer peripheral surface of hub shaft 38. In this embodiment, first side of hub shaft 38 is the left side in FIG. 1, and the second side of hub shaft 38 is the right side in FIG. 1. End cap 42 includes a side surface 66 and a frame mounting boss 70, wherein side surface 66 abuts against the inner side surface of the fork or frame member (not shown) to which bicycle hub 10 is mounted, and frame mounting boss 70 fits within a mounting slot in the fork or frame member in a conventional manner. Similarly, end cap 46 includes a side surface 74 and a frame mounting boss 78, wherein side surface 74 abuts against the inner side surface of the fork or frame member to which bicycle hub 10 is mounted, and frame mounting boss 78 fits within a mounting slot in the fork or frame member in a conventional manner.

Quick-release mechanism 18 includes a quick-release rod 82 and end caps 86 and 90. Quick release rod 82 extends through hub shaft 38, end cap 86 is attached to the first side of quick release rod 82 through a conventional cam mechanism 94 that is operated by a quick-release lever 98, and end cap 90 is attached to the second side of quick release rod 82. The detailed structure and operation of quick-release mechanism 18 is well-known and does not form a part of the present invention, so further explanation of quick release mechanism 18 shall be omitted.

Figure 3:
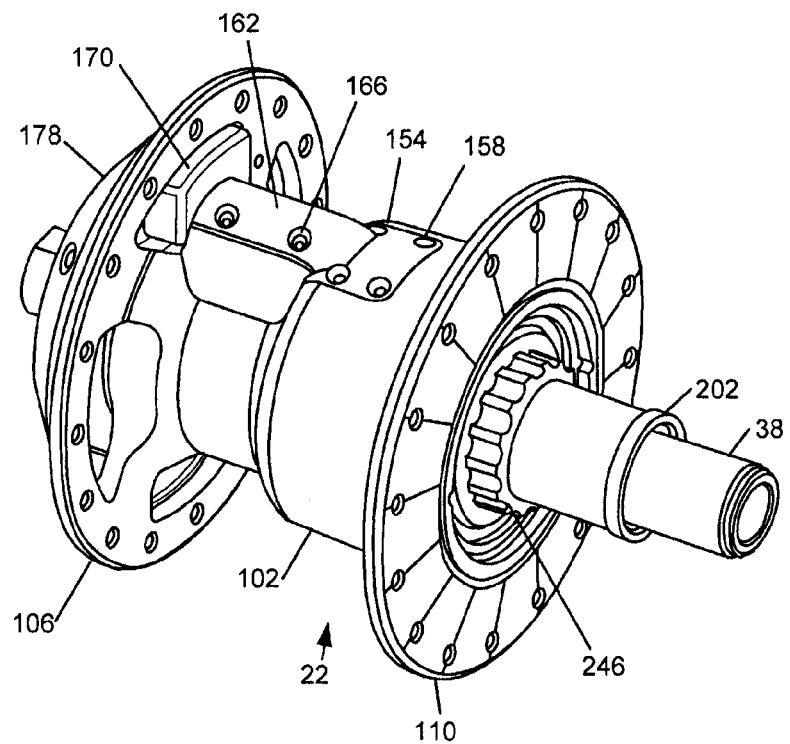
FIG. 3 is a perspective view of the bicycle hub.
Figure 4:
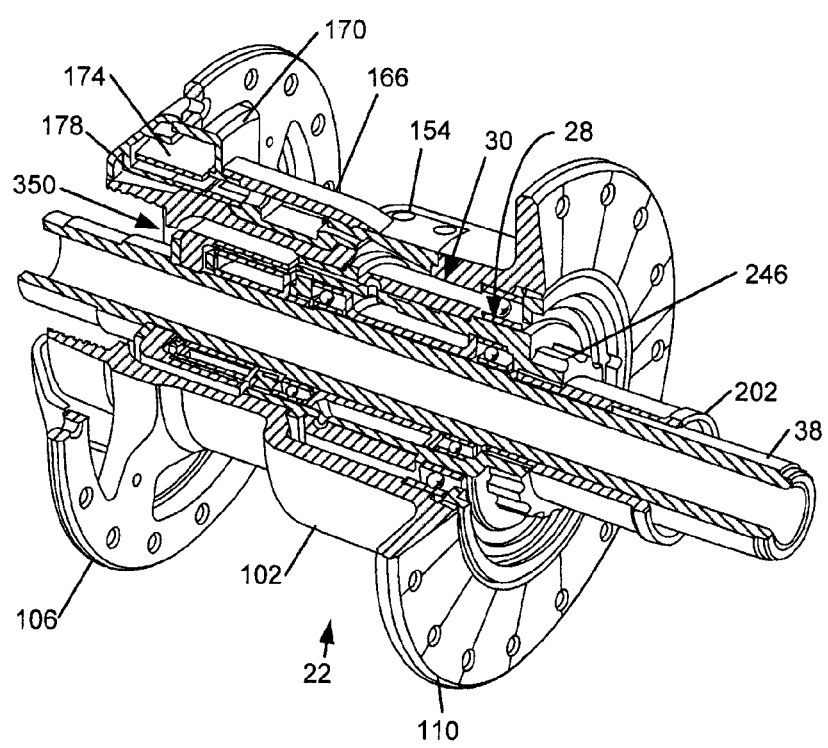
FIG. 4 is a partial cut-away perspective view of the bicycle hub.
Figure 5:
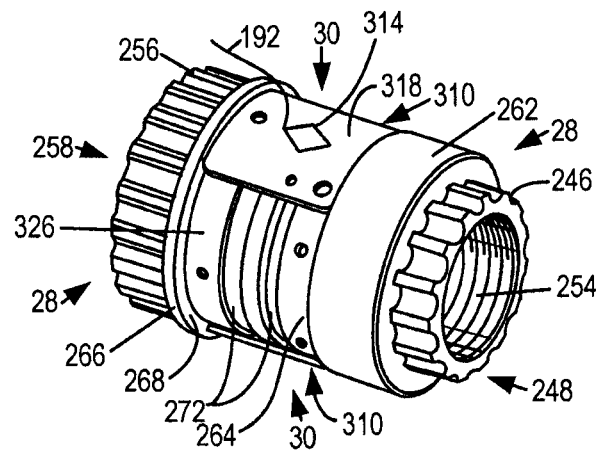
FIG. 5 is a perspective view of the sensor shaft, sensor base and force sensor.

Hub shell unit 22 may be formed from aluminum, for example. As shown in FIGS. 1, 3 and 4, hub shell unit 22 includes a hub shell body 102 and first and second spoke mounting flanges 106 and 110. The first side of hub shell body 102 is rotatably supported on the first side of hub shaft 38 by a bearing unit 114 comprising a bearing cone 118 mounted to hub shaft 38, a bearing cup 122 mounted to the inner peripheral surface of hub shell body 102, and a plurality of ball bearings 126 disposed between bearing cone 118 and bearing cup 122. Bearing cone 118 has an internal thread that engages an external thread of hub shaft 38. A protective cover 130 is mounted to hub shaft 38 the left of bearing unit 114 to seal the space between hub shaft 38 and hub shell body 102 and protect bearing unit 114 from contaminants. The second side of hub shell body 102 is rotatably supported on a sensor shaft 28 by a bearing unit 138 comprising an inner bearing race 142 mounted to sensor shaft 28, an outer bearing race 146 mounted to the inner peripheral surface of hub shell body 102, and a plurality of ball bearings 150 disposed between inner bearing race 142 and outer bearing race 146.

Figure 6:
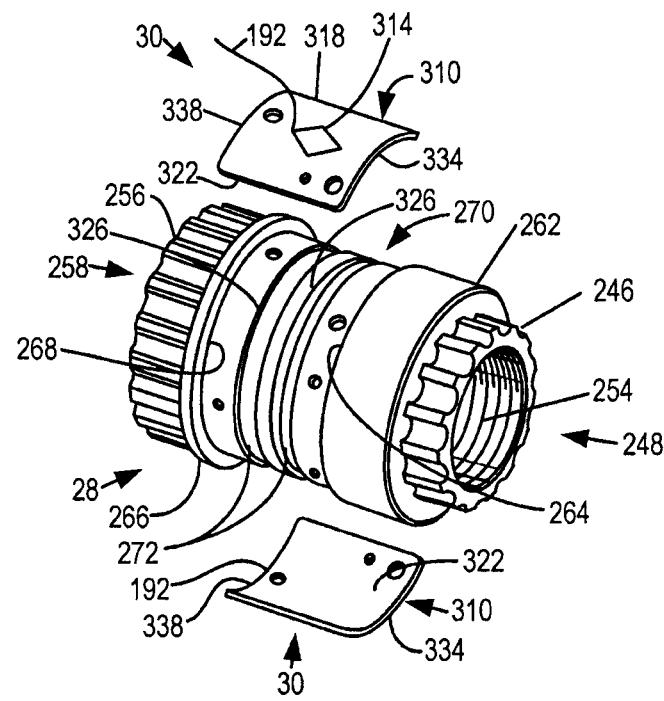
FIG. 6 is an exploded perspective view showing the sensor base and force sensor removed from the sensor shaft.
Figure 7:
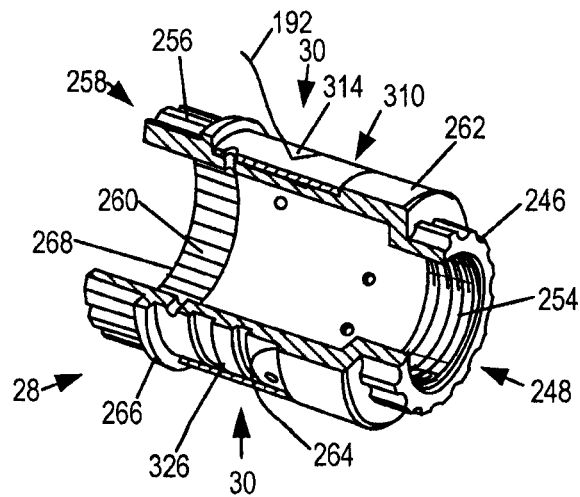
FIG. 7 is a partial cut-away perspective view of the sensor shaft and sensor base.

A first access cover 154 is mounted to hub shell body 102 by screws 158 (FIG. 3), a second access cover 162 is mounted to hub shell body 102 by screws 166, and a circuit mounting housing 170 is mounted to hub shell body 102 by screws (not shown). Circuit mounting housing 170 supports a circuit board 174 that has various electrical components mounted to it. A protective cover 178 is mounted to the first side of spoke-mounting flange 106 to form a sealed housing with circuit mounting housing 170 to protect the electrical components on circuit board 174 from contaminants. Passages 182, 186 and 190 are formed in first access cover 154, second access cover 162 and circuit mounting housing 170, respectively, to allow the passage of wires 192 (FIG. 6) connected to circuit board 174.

Freewheel unit 26 comprises a tubular sprocket mounting sleeve 194, a one-way clutch 198, and a tubular bushing 202. The outer peripheral surface of sprocket mounting sleeve 194 includes a plurality of splines 206 for mounting a plurality of sprockets (not shown) in a conventional manner. One-way clutch 198 comprises a tubular pawl support 210, a bearing adjust member 211 screwed onto pawl support 210, a plurality of pawls 214 supported on the outer peripheral surface of pawl support 210, and a plurality of ratchet teeth 218 formed on the inner peripheral surface of sprocket mounting sleeve 194. Sprocket mounting sleeve 194 is rotatably supported on pawl support 210 by bearing adjust member 211 and ball bearings 222 and 226. Pawl support 210 is rotatably mounted on hub shaft 38 by a bearing cone 230 mounted to hub shaft 38 and a plurality of ball bearings 234 disposed between bearing cone 230 and the inner peripheral surface of bearing adjust member 211. Bearing cone 230 has an internal thread that engages an external thread on hub shaft 38. Pawls 214 are biased towards engagement with ratchet teeth 218 by a pawl spring 238 in a well-known manner, and ratchet teeth 218 are configured in a well-known manner such that pawls 214 communicate rotational force from sprocket mounting sleeve 194 to pawl support 210 only in one rotational direction. Pawl support 210 is coupled to sensor shaft 28 by a plurality of internal splines 242 that engage a plurality of external splines 246 formed on the outer peripheral surface of a sensor shaft 28 so that pawl support 210 and sensor shaft 28 rotate as a unit. Pawl support 210 is further supported on tubular bushing 202, and tubular bushing 202 is coupled to sensor shaft 28 by external threads 250 that engage internal threads 254 formed on the inner peripheral surface of sensor shaft 28 so that tubular bushing 202 and sensor shaft 28 are prevented from detaching from each other and also rotate as a unit.

Sensor shaft 28 may be formed from stainless steel, for example. As shown in FIGS. 1 and 5-7, sensor shaft 28 is a tubular hub member having the plurality of external splines 246 on one free shaft end portion 248 to receive the rotational driving force from pawl support 210, a plurality of splines 256 formed around the outer peripheral surface of an opposite free shaft end portion 258, and a plurality of internal splines 260 formed on the inner peripheral surface of opposite free shaft end portion 258. In the following discussion, splines 256 are referred to as hub coupling splines 256, and splines 260 are referred to as dynamo coupling splines 260. Hub coupling splines 256 engage a plurality of splines 259 formed on the inner peripheral surface of hub shell body 102 at an intermediate (e.g., center) location of hub shell unit 22 to communicate rotational force evenly to spoke mounting flanges 106 and 110 to prevent distortion of hub shell unit 22. In the following discussion, splines 259 are referred to as hub drive splines 259. Hub coupling splines 256 and hub drive splines 259 are coupled between first flange 106 of hub shell body 102 and second flange 110 of hub shell body 102. Sensor shaft 28 further includes a radially outwardly extending first annular flange 262 and a radially outwardly extending second annular flange 266. First annular flange 262 and second annular flange 266 have side surfaces 264 and 268, respectively, that define a sensor unit mounting recess 270 therebetween. A pair of axially-spaced annular recesses 272 are formed in sensor unit mounting recess 270.

The second side of sensor shaft 28 is rotatably supported on hub shaft 38 by a bearing unit 274 comprising an inner bearing race 278 mounted to hub shaft 38, an outer bearing race 282 mounted to the inner peripheral surface of sensor shaft 28, and a plurality of ball bearings 286 disposed between inner bearing race 278 and outer bearing race 282. Similarly, the left side of sensor shaft 28 is rotatably supported on hub shaft 38 by a bearing unit 290 comprising an inner bearing race 294 mounted to hub shaft 38, an outer bearing race 298 mounted to the inner peripheral surface of sensor shaft 28, and a plurality of ball bearings 302 disposed between inner bearing race 294 and outer bearing race 298. In this embodiment, hub coupling splines 256 and hub drive splines 259 are vertically aligned with bearing assembly 290 to ensure strength and stability of the connection between hub coupling splines 256 and hub drive splines 259. A tubular spacer 306 is disposed between bearing units 274 and 290 to maintain bearing units 274 and 290 at the proper axial spacing.

Each force sensor unit 30 comprises a sensor base 310 and a force sensor 314. Sensor base 310 is a plate and may be made of aluminum or stainless steel, for example, so that sensor base 310 more readily deforms relative to sensor shaft 28 to increase sensitivity to torsional strain applied to sensor shaft 28. Sensor base 314 is used to adjust the sensitivity of force sensor unit 30. In this embodiment, sensor base 310 has the shape of a square plate with a convex curved upper surface 318 (FIG. 6) and a concave curved lower surface 322. As a result, the concave curved lower surface 322 of sensor base 310 may conform to the convex curved outer peripheral surface 326 of sensor unit mounting recess 270 of sensor shaft 28 when sensor base 310 is mounted to sensor shaft 28, thereby further increasing sensitivity to torsional strain applied to sensor shaft 28. In this embodiment, sensor base 310 is mounted to sensor shaft 28 through axially offset fasteners in the form of screws 330 fixed to sensor shaft 28. Preferably, screws 330 penetrate through sensor shaft 28 to further ensure that torsional strain is communicated to sensor base 310. Annular recesses 272 in sensor shaft 28 further allow sensor base 310 to flex in response to torsional strain applied to sensor shaft 28. Of course, if desired, only one annular recess 272 may be provided, or annular recesses 272 may be omitted entirely. Finally, sensor base 310 includes axially opposite side surfaces 334 and 338 that face and are in close proximity to (e.g., contact) side surfaces 264 and 266 of first annular flange 262 and second annular flange 266, respectively, to further increase sensitivity to torsional strain applied to sensor shaft 28.

In this embodiment, force sensor 314 comprises a strain gauge mounted to the curved upper surface 318 of sensor base 310 so that sensor base 310 is disposed between force sensor 314 and sensor shaft 28. The strain gauge may be made from resistive metal, semiconductor material, and so on. Force sensor 314 may be mounted to sensor base 310 by an appropriate adhesive. If sensor base is formed of a semiconductor material (e.g., silicon, etc.), then force sensor 314 may be formed as part of sensor base 310 by appropriate doping of the substrate. The removable nature of sensor base 310 makes is possible to use sensor bases formed from different materials depending upon on the sensitivity desired from force sensor 314. In this embodiment, force sensor 314 is disposed axially between bearing unit 274 and bearing unit 290. Force sensor 314 also is disposed between bearing unit 114 and bearing unit 138. Both features lessen the effect of cantilevered forces on the force sensing operation.

Force sensor 314 is connected to circuit board 174 by wiring 192. The electrical components on circuit board 174, which may include a programmed CPU, memory and appropriate input and output interfaces, process the signals from force sensor 314 and may communicate the result to a communication element such as a wireless (e.g., RF) transmitter 346 disposed within or beneath second access cover 162 so that wireless transmitter 346 may communicate the information to another location (e.g., to a cycle computer mounted on the bicycle handlebars). The electrical components on circuit board 174, such as the programmed CPU, may use signals from the coil of a dynamo (such as the dynamo described in the second embodiment below) to calculate bicycle speed in a known manner. The components may further calculate power based on the signals from force sensor 314 and the speed of the bicycle.

Dynamo 34 comprises a stator 350 and a rotor 354, wherein stator 350 is axially fixed on hub shaft 38 by a nut 366. Stator 350 comprises a cup-shaped yoke 358 and a magnet 362, wherein yoke 358 is nonrotatably mounted to hub shaft 38. Magnet 362 is a ring-shaped magnet that has circumferentially alternating north and south poles.

Figure 8:
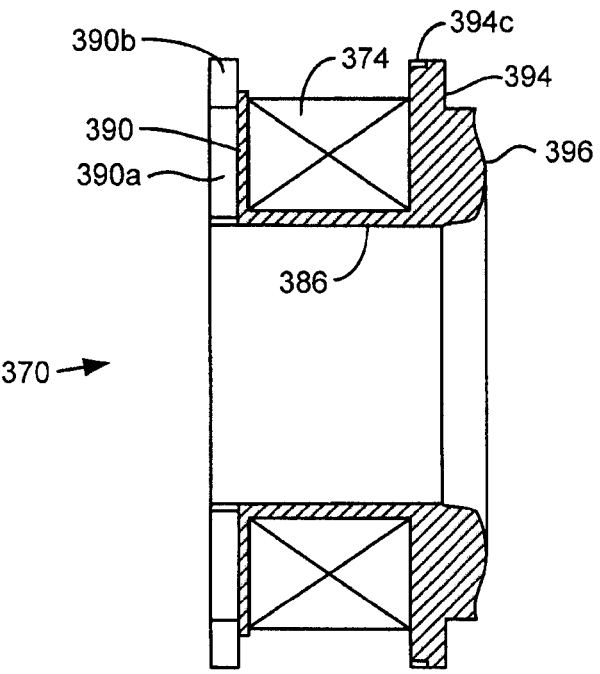
FIG. 8 is a cross-sectional view of an embodiment of a bobbin.
Figure 9:
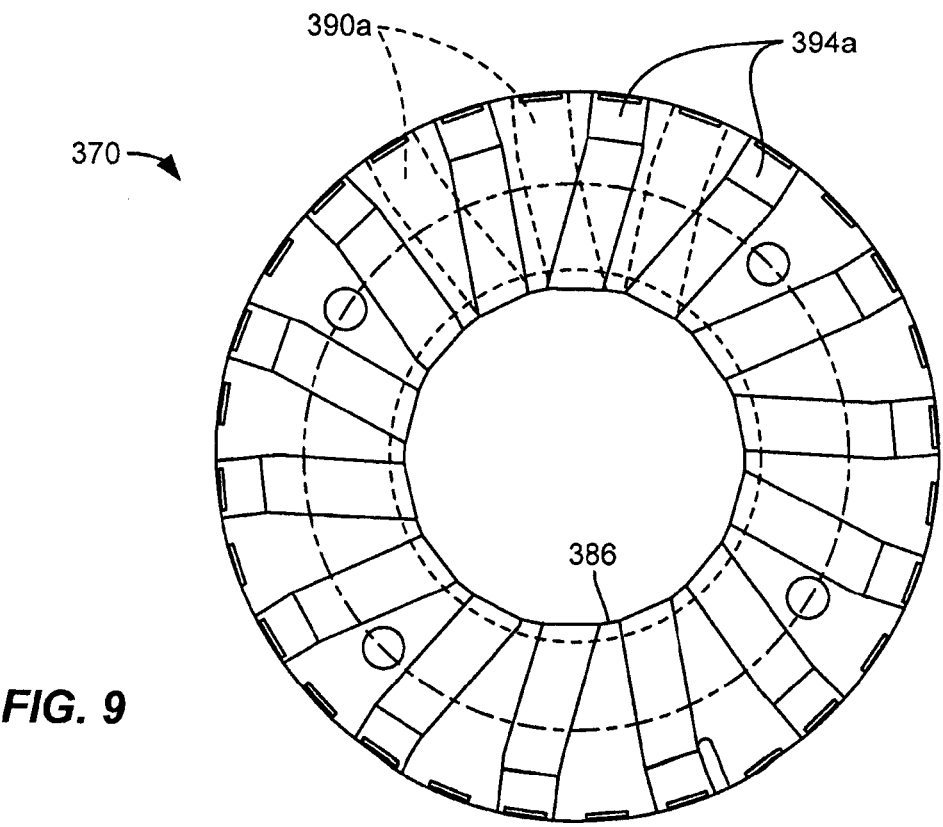
FIG. 9 is a side view of the bobbin.
Figure 10:
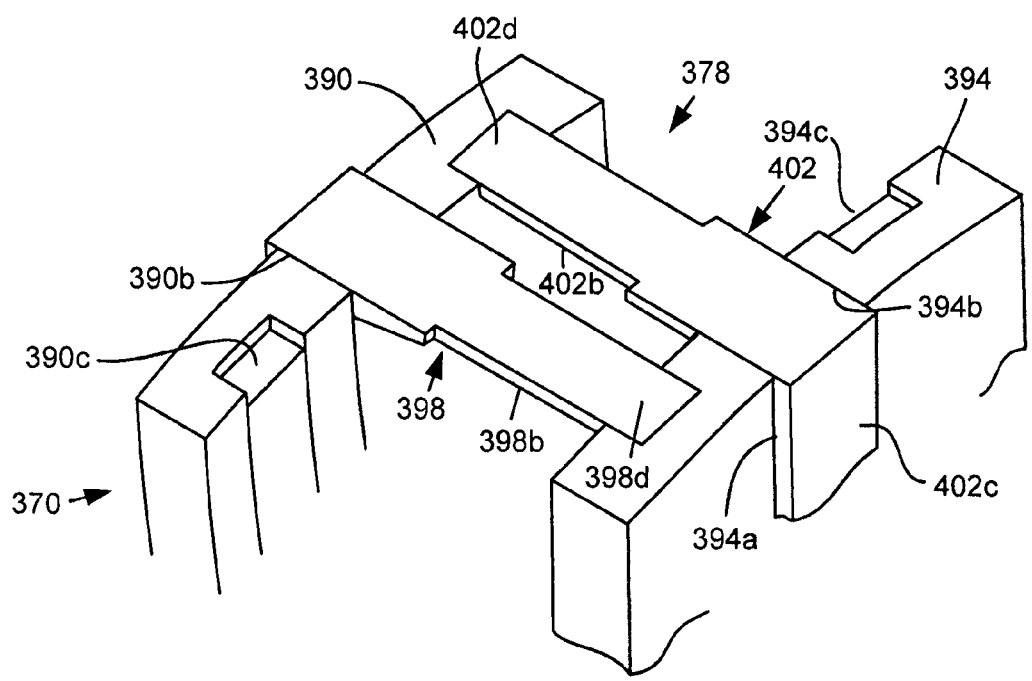
FIG. 10 is a partial perspective view of a particular embodiment of yoke arms installed in the bobbin.

As shown in FIGS. 1 and 8-11, rotor 354 comprises a bobbin 370, a coil 374 wound around bobbin 370, and a yoke assembly 378 (FIG. 10) mounted to bobbin 370. Bobbin 370, coil 374 and yoke assembly 378 are constructed substantially according to the teachings of U.S. Pat. No. 6,992,413. For example, as shown more clearly in FIG. 8, bobbin 370 has a tubular barrel 386, a first flange 390, and a second flange 394. First flange 390 and second flange 394 are formed at opposite axial ends of barrel 386, and coil 374 is wound around tubular barrel 386. As shown in FIG. 9, grooves 390a and 394a are formed on the side surfaces of the first and second flanges 390 and 394, respectively, wherein grooves 390a and 394a extend in essentially a radial direction. Grooves 390a and 394a are formed such that, when viewed along the axial direction: (i) radially outer portions of grooves 390a and 394a are offset relative to each other, i.e., a radially outer portion of a groove 394a of second flange 394 is positioned between adjacent two radially outer portions of grooves 390a of first flange 390, and (ii) the radially inner portions of grooves 390a and 394a, respectively, overlap virtually completely with each other. As shown in FIGS. 8 and 10, the radially outer portion of each groove 390a and 394a is cut out to form a notch 390b and 394b, respectively. Furthermore, as shown more clearly in FIG. 10, a plurality of indentations 390c and 394c are formed on the upper inner surfaces of first and second flanges 390 and 394 where no groove 390a or 394a is formed. A rotor drive member 396 extends axially in the second direction from second flange 394.

Figure 11:
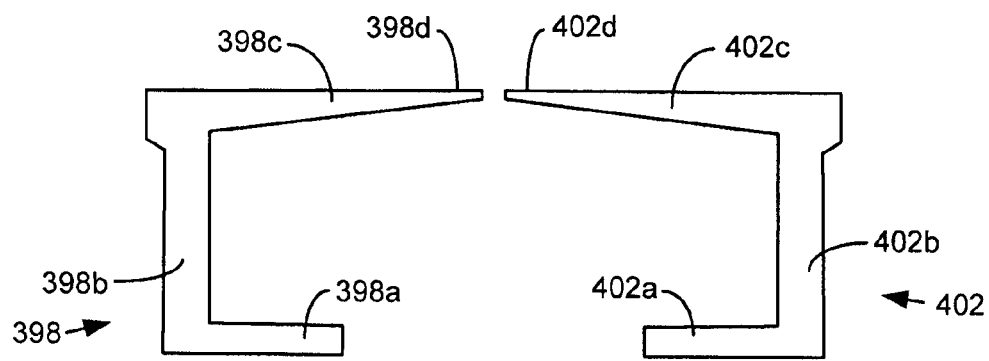
FIG. 11 is a front view of a particular embodiment of yoke arms used with the bobbin.

As shown in FIG. 10, yoke assembly 378 comprises a plurality of one-piece first arms 398 and a plurality of one-piece second arms 402 (only one first arm 398 and only one second arm 402 are shown). As shown in FIG. 11, each first arm 398 has a radially inner portion 398a, an intermediate portion 398b, a radially outer portion 398c, and an indentation engaging portion 398d. When the plurality of first arms 398 are mounted to bobbin 370, each radially inner portion 398a is disposed beneath tubular barrel 386, and intermediate portion 398b is fitted within a groove 390a in first flange 390. Radially outer portion 398c extends axially from notch 390b in first flange 390 towards second flange 394 and terminates with indentation engaging portion 398d fitted within in an indentation 394c in second flange 394. Similarly, each second arm 402 has a radially inner portion 402a, an intermediate portion 402b, a radially outer portion 402c, and an indentation engaging portion 402d. When the plurality of second arms 402 are mounted to bobbin 370, each radially inner portion 402a is disposed beneath tubular barrel 386, and intermediate portion 402b is fitted within a groove 394a in second flange 394. Radially outer portion 402c extends axially from notch 394b in second flange 394 towards first flange 390 and terminates with indentation engaging portion 402d fitted within an indentation 390c in first flange 390.

Rotor drive member 396 is a tubular member that includes a plurality splines 406 formed on the outer peripheral surface thereof. Splines 406 engage the plurality of dynamo coupling splines 260 on sensor shaft 28 so that sensor shaft 28, rotor drive member 396, bobbin 370, coil 374 and yoke assembly 378 rotate together as a unit relative to stator 350. As a result, dynamo 30 generates electricity in response to rotation of sensor shaft 28. The generated electricity is stored in an accumulator 406 on circuit board 174. Accumulator 406 may be a battery, a capacitor, or some other suitable charge storing device that receives direct current from a rectifier on circuit board 174 (or from some other location), wherein the rectifier receives current from coil 374 of dynamo 34. Accumulator 406 supplies electric power to various components on the bicycle, such as force sensor 314 and transmitter 346.

While the above is a description of various embodiments of inventive features, further modifications may be employed without departing from the spirit and scope of the present invention. For example, while first arms 398 and second arms 402 each were formed as one piece, first arms 398 and second arms 402 could be formed as laminated plates as disclosed in the above-cited U.S. Pat. No. 6,992,413.

Figure 12:
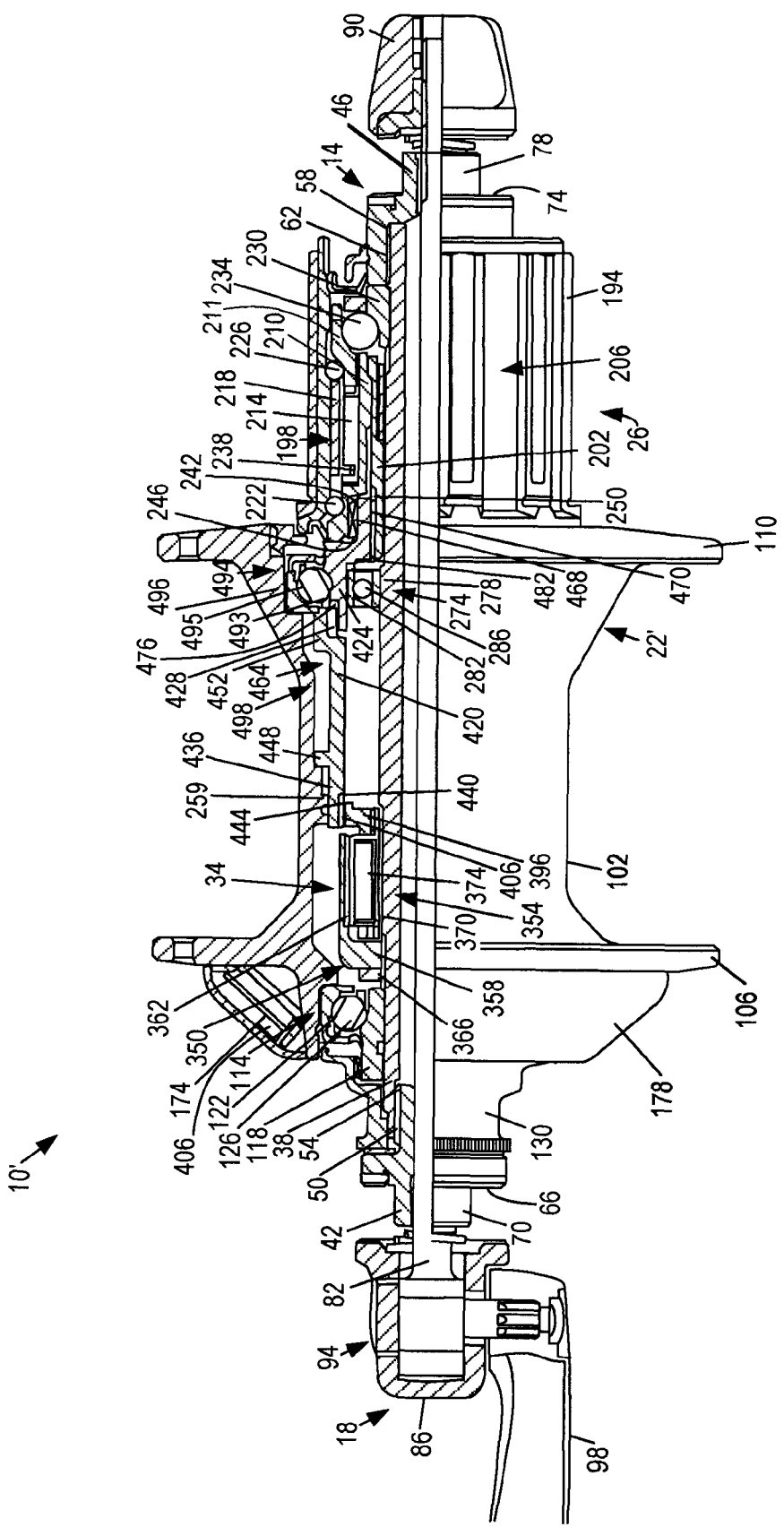
FIG. 12 is a partial cross-sectional view of another embodiment of a bicycle hub.

FIG. 12 is a partial cross-sectional view of another embodiment of a bicycle hub 10'. Bicycle hub 10' is very similar to bicycle hub 10 in the first embodiment, so only the differences will be explained in detail. Components that are the same as the components in the first embodiment are numbered the same.

As shown in FIG. 12, bicycle hub 10' has a slightly different hub shell unit 22' in that circuit board 174, transmitter 346 and accumulator 406 are disposed completely within cover 178. Furthermore, sensor shaft 28 in the first embodiment has been replaced by a different sensor shaft 420 that is coupled to an intermediate drive member in the form of an intermediate drive shaft 424 which, in turn, is coupled to pawl support 210.

Figure 13:
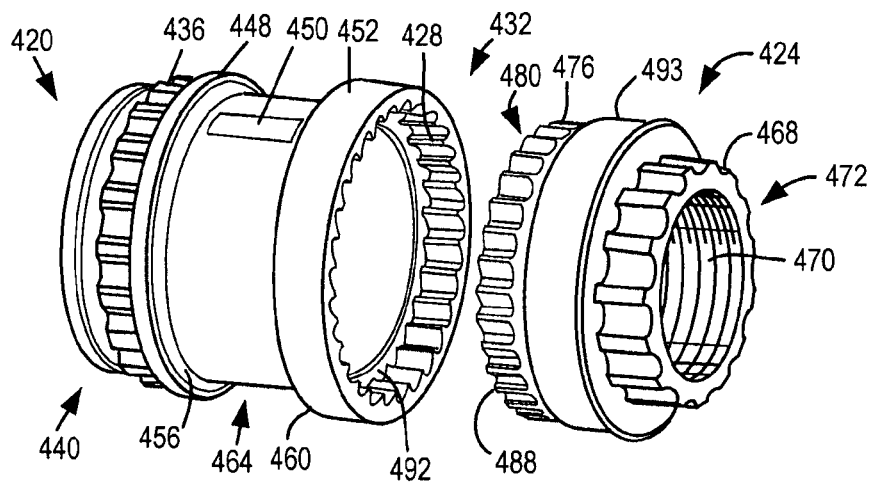
FIG. 13 is an exploded view of the intermediate drive member and sensor shaft.

As shown in FIGS. 12 and 13, sensor shaft 420 is a tubular hub member having a plurality of internal splines 428 on one free shaft end portion 432 to receive the rotational driving force from intermediate drive shaft 424, a plurality of hub coupling splines 436 formed around the outer peripheral surface of an opposite free shaft end portion 440, and a plurality of internal splines 444 formed on the inner peripheral surface of opposite free shaft end portion 440. In the following discussion, splines 428 are referred to as intermediate drive shaft coupling splines 428, and splines 444 are referred to as dynamo coupling splines 444. Hub coupling splines 436 engage the plurality of hub drive splines 259 formed on the inner peripheral surface of hub shell body 102 as in the first embodiment. In this embodiment, the outer surface of hub shell body 102 does not have an opening between first flange 106 and second flange 110, so there is no need for first and second access covers 154 and 162. Instead, an opening (not shown) is formed in the vicinity of the base of first flange 106 beneath cover 178 so that the wiring from dynamo 34 and force sensor unit 498 discussed below may pass through the interior of hub shell body 102 to circuit board 174. Sensor shaft 420 further includes a radially outwardly extending first annular flange 448 and a radially outwardly extending second annular flange 452. First annular flange 448 and second annular flange 452 have side surfaces 456 and 460, respectively, that define a sensor unit mounting recess 464 therebetween.

Figure 15:
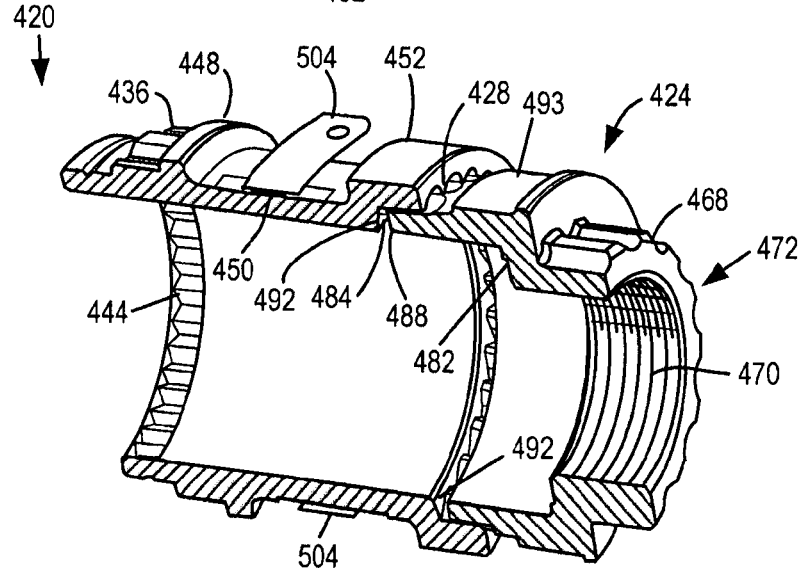
FIG. 15 is a partial cut-away perspective view the intermediate drive member and sensor shaft.

Intermediate drive shaft 424 also is a tubular hub member having a plurality of external splines 468 and internal threads 470 on one free shaft end portion 472 and a plurality of external splines 476 formed around the outer peripheral surface of an opposite free shaft end portion 480. In the following discussion, splines 468 are referred to as pawl support coupling splines 468, and splines 476 are referred to as sensor shaft coupling splines 476. Pawl support coupling splines 468 engage the plurality of internal splines 242 formed on pawl support 210 to receive the rotational driving force from pawl support 210, and internal threads 470 engage external threads 250 on tubular bushing 202. Sensor shaft coupling splines 476 engage intermediate drive shaft splines 428 formed on sensor shaft 420 to communicate the rotational driving force to sensor shaft 420. Bearing unit 274 abuts against an internal side surface 482 of intermediate drive shaft 424 to form a space 484 (FIG. 15) between an end face 488 of intermediate drive shaft 424 and an end face 492 of sensor shaft 420 so that sensor shaft 420 and intermediate drive shaft 424 can move axially relative each other. Of course, space 484 could be created by a bushing or some other abutment rather than by bearing unit 274. The outer peripheral surface of intermediate drive shaft 424 forms an inner bearing race 493 for a bearing unit 494. Bearing unit 494 further includes a plurality of ball bearings 495 and an outer bearing race 496, wherein outer bearing race 496 is mounted to the inner peripheral surface of hub shell body 102, and ball bearings 495 are supported between inner bearing race 493 and outer bearing race 496.

Figure 14:
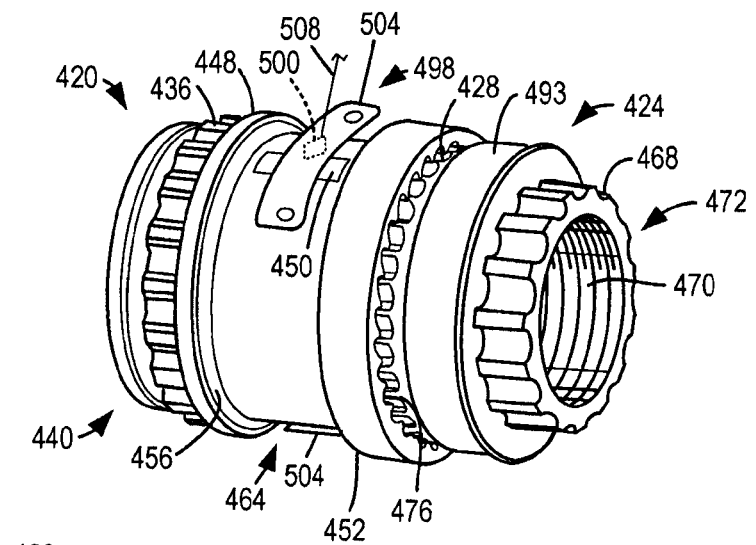
FIG. 14 is a perspective view of the intermediate drive member and sensor shaft with the force sensor partially attached to the sensor shaft.

As shown in FIG. 14, a pair of flattened (planar) exterior surfaces 450 are formed on opposite sides of the outer peripheral surface of sensor shaft 420 within sensor unit mounting recess 464 (only one such flattened surface 450 is shown in FIG. 14). A corresponding pair of force sensor unit 498 are mounted to the outer peripheral surface of sensor shaft 420. Each force sensor unit 498 comprises a semiconductor strain gauge 500 disposed on the undersurface of a flexible base 504 so that strain gauge 500 is disposed between flexible base 504 and a corresponding flattened surface 450. Flexible base 504 may be mounted to sensor shaft 420 by a suitable adhesive or by some other means. A wire 508 is connected to strain gauge 500 to communicate the signals from strain gauge 500 to circuit board 174. In this embodiment, at least two force sensor units 498 and corresponding flattened surfaces 450 are disposed on sensor shaft 420. The force sensor units 498 are preferably, but not necessarily, symmetrically arranged on the surface of sensor shaft 420 about the axis of sensor shaft 420.

As noted above, a space 484 is formed between an end face 488 of intermediate drive shaft 424 and an end face 492 of sensor shaft 420. Space 484 minimizes the chance that axial movement of intermediate drive shaft 424 toward sensor shaft 420 resulting from axial thrust forces applied to the components mounted to the right of intermediate drive shaft 424, such as from freewheel unit 26, will be communicated to sensor shaft 420. Such thrust forces could be erroneously recognized as rotational force by strain gauge 500.

The size, shape, location or orientation of the various components may be changed as desired. For example hub coupling splines 256 and hub drive splines 259 in each embodiment need not be centered between first and second flanges 106 and 110. Hub coupling splines 256 and hub drive splines 259 could be aligned closer to second flange 110 to allow more room for additional force sensor units at the opposite axial end of the sensor shaft. Components that are shown directly connected or contacting each other may have intermediate structures disposed between them. Separate components may be combined, and vice versa. For example, sensor shaft 34 and pawl support 210 in the first embodiment may be formed as one continuous piece, and intermediate drive shaft 424 and pawl support 210 in the second embodiment may be formed as one continuous piece. Components may be omitted or substituted. For example, bearing unit 274 in the second embodiment may be omitted. Friction bushings could be substituted for ball beating units. For example, bearing unit 138 could be omitted and replaced with an appropriate bushing sleeve disposed between sensor shaft 28 and hub shell body 102. Dynamo 24 could be omitted and replaced by a battery.

The functions of one element may be performed by two, and vice versa. The function of one element may be performed by another, and functions may be interchanged among the elements. The structures and functions of one embodiment may be adopted in another embodiment. For example, force sensor unit 310 may be used in place of force sensor unit 498, and vice versa. While a dynamo 34 having an internal rotor was described, dynamo 34 could be replaced with a dynamo that uses an external rotor. In that case the coil of the dynamo could be fixed to hub shaft 38, and the magnet could rotate with hub shell body 102. The coil could be electrically connected to circuit board 174 by a contact sleeve or through other suitable wiring. Accumulator 406 could be omitted so that electrical power is supplied directly to the electrical components by a rectifier.

It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle hub apparatus comprising:
an axle;
a hub member supported for rotation around the hub axle;
an intermediate drive member supported for rotation around the hub axle and having a first portion and a second portion, wherein the first portion of the intermediate drive member is structured to receive an external rotational driving force;
a sensor shaft supported for rotation around the hub axle and having a first portion and a second portion, wherein the first portion of the sensor shaft is coupled to the second portion of the intermediate drive member to receive the rotational driving force;
wherein the intermediate drive member and the sensor shaft are coupled to each other within the hub member;
wherein the second portion of the sensor shaft is coupled to the hub member for communicating the rotational driving force to the hub member; and
a force sensor unit disposed on the sensor shaft.

2. The apparatus according to claim 1 wherein the intermediate drive member and the sensor shaft are coupled to permit axial movement relative to each other.

3. The apparatus according to claim 1 wherein a space is formed between the intermediate drive member and the sensor shaft.

4. The apparatus according to claim 1 wherein the second portion of the intermediate drive member is spline-connected to the first portion of the sensor shaft.

5. The apparatus according to claim 1 wherein the second portion of the sensor shaft is coupled to the hub member between a first flange of the hub member and a second flange of the hub member.

6. The apparatus according to claim 1 wherein the second portion of the sensor shaft is coupled to the hub member at an axially intermediate location relative to the hub member for communicating the rotational driving force to the hub member.

7. The apparatus according to claim 6 wherein the second portion of the sensor shaft is coupled to the hub member at substantially an axial center of the hub member.

8. The apparatus according to claim 1 wherein the second portion of the intermediate drive member is spline-connected to the hub member.

9. The apparatus according to claim 1 wherein the second portion of the sensor shaft includes a shaft end disposed at an axially intermediate location relative to the hub member.

10. The apparatus according to claim 9 wherein the shaft end is disposed at substantially an axial center of the hub member.

11. The apparatus according to claim 1 further comprising a communication element that communicates signals from the force sensor unit to another location.

12. The apparatus according to claim 11 wherein the communication element wirelessly communicates the signals from the force sensor unit to the other location.

13. The apparatus according to claim 1 further comprising a first bearing disposed between the intermediate drive member and the hub axle.

14. The apparatus according to claim 13 further comprising a second bearing disposed between the intermediate drive member and the hub member.

15. The apparatus according to claim 1 further comprising:
a first bearing disposed between the hub member and the hub axle;
a second bearing disposed between the hub member and the intermediate drive member; and
wherein the force sensor unit is disposed on the sensor shaft axially between the first bearing and the second bearing.

16. A bicycle hub apparatus comprising:
an axle;
a hub member supported for rotation around the hub axle;
a sensor shaft supported for rotation around the hub axle and having a first portion and a second portion, wherein the first portion of the sensor shaft is structured to receive an external rotational driving force, wherein the second portion of the sensor shaft is coupled to the hub member for communicating the rotational driving force to the hub member, and wherein the second portion of the sensor shaft is disposed relatively between a first flange of the hub member and a second flange of the hub member; and
a force sensor unit disposed on the sensor shaft.

17. The apparatus according to claim 16 wherein the second portion of the sensor shaft is disposed at an axially intermediate location relative to the hub member.

18. The apparatus according to claim 17 wherein the second portion of the sensor shaft is disposed at substantially an axial center of the hub member.

19. The apparatus according to claim 16 wherein the second portion of the sensor shaft is spline-connected to the hub member.

20. The apparatus according to claim 16 further comprising an intermediate drive member supported for rotation around the hub axle and having a first portion and a second portion, wherein the first portion of the intermediate drive member is structured to receive the external rotational driving force, and wherein the second portion of the intermediate drive member communicates rotational drive force to the first portion of the sensor shaft.

21. The apparatus according to claim 20 wherein the intermediate drive member and the sensor shaft are coupled to each other within the hub member.

22. The apparatus according to claim 20 wherein the intermediate drive member and the sensor shaft are coupled to permit axial movement relative to each other.

23. The apparatus according to claim 20 wherein the second portion of the intermediate drive member is spline-connected to the first portion of the sensor shaft.

24. The apparatus according to claim 20 wherein a space is formed between the intermediate drive member and the sensor shaft.

25. The apparatus according to claim 20 wherein the second portion of the sensor shaft is coupled to the hub member between a first flange of the hub member and a second flange of the hub member.

26. The apparatus according to claim 20 wherein the second portion of the sensor shaft is coupled to the hub member at an axially intermediate location relative to the hub member for communicating the rotational driving force to the hub member.

27. The apparatus according to claim 26 wherein the second portion of the sensor shaft is coupled to the hub member at substantially an axial center of the hub member.

28. The apparatus according to claim 20 wherein the second portion of the intermediate drive member is spline-connected to the hub member.

29. The apparatus according to claim 20 wherein the second portion of the sensor shaft includes a shaft end disposed at an axially intermediate location relative to the hub member.

30. The apparatus according to claim 29 wherein the shaft end is disposed at substantially an axial center of the hub member.

31. The apparatus according to claim 20 further comprising a communication element that communicates signals from the force sensor unit to another location.

32. The apparatus according to claim 31 wherein the communication element wirelessly communicates the signals from the force sensor unit to the other location.

33. The apparatus according to claim 20 further comprising a first bearing disposed between the intermediate drive member and the hub axle.

34. The apparatus according to claim 33 further comprising a second bearing disposed between the intermediate drive member and the hub member.

35. The apparatus according to claim 20 further comprising:
a first bearing disposed between the hub member and the hub axle;
a second bearing disposed between the hub member and the intermediate drive member; and
wherein the force sensor unit is disposed on the sensor shaft axially between the first bearing and the second bearing.

36. A bicycle hub apparatus comprising:
an axle;
a hub member supported for rotation around the hub axle;
a sensor shaft supported for rotation around the hub axle and having a first portion and a second portion, wherein the first portion of the sensor shaft is structured to receive an external rotational driving force, and wherein the second portion of the sensor shaft is coupled to the hub member for communicating the rotational driving force to the hub member;
a force sensor unit disposed on the sensor shaft; and
a dynamo disposed within the hub member, wherein the dynamo receives rotational driving force from at least one of the sensor shaft or the hub member.

37. The apparatus according to claim 36 wherein the dynamo comprises:
a magnetic member coupled to the axle; and
a coil member coupled to rotate with the hub member.

38. The apparatus according to claim 36 further comprising an accumulator that stores power generated by the dynamo.

39. The apparatus according to claim 36 wherein the second portion of the sensor shaft is coupled to the hub member between a first flange of the hub member and a second flange of the hub member.

40. The apparatus according to claim 36 wherein the second portion of the sensor shaft is coupled to the hub member at an axially intermediate location of the hub member for communicating the rotational driving force to the hub member.

41. The apparatus according to claim 40 wherein the second portion of the sensor shaft is coupled to the hub member at substantially an axial center of the hub member.

42. The apparatus according to claim 36 further comprising a communication element that communicates signals from the force sensor unit to another location.

43. The apparatus according to claim 42 wherein the communication element wirelessly communicates the signals from the force sensor unit to the other location.

44. The apparatus according to claim 36 wherein the force sensor unit is disposed between the first portion of the sensor shaft and the dynamo.

45. The apparatus according to claim 36 wherein the second portion of the sensor shaft is disposed axially between the dynamo and the force sensor unit.

46. The apparatus according to claim 36 further comprising an intermediate drive member supported for rotation around the hub axle and having a first portion and a second portion, wherein the first portion of the intermediate drive member is structured to receive the external rotational driving force, and wherein the second portion of the intermediate drive member communicates rotational drive force to the first portion of the sensor shaft.

47. The apparatus according to claim 46 wherein the intermediate drive member and the sensor shaft are coupled to each other within the hub member.

48. The apparatus according to claim 46 wherein the intermediate drive member and the sensor shaft are coupled to permit axial movement relative to each other.

49. The apparatus according to claim 46 wherein the second portion of the intermediate drive member is spline-connected to the first portion of the sensor shaft.

50. The apparatus according to claim 46 wherein a space is formed between the intermediate drive member and the sensor shaft.

51. The apparatus according to claim 46 wherein the second portion of the intermediate drive member is spline-connected to the hub member.

52. The apparatus according to claim 46 wherein the second portion of the sensor shaft includes a shaft end disposed at an axially intermediate location relative to the hub member.

53. The apparatus according to claim 52 wherein the shaft end is disposed at substantially an axial center of the hub member.

54. The apparatus according to claim 46 further comprising a first bearing disposed between the intermediate drive member and the hub axle.

55. The apparatus according to claim 54 further comprising a second bearing disposed between the intermediate drive member and the hub member.

56. The apparatus according to claim 46 further comprising:
a first bearing disposed between the hub member and the hub axle;
a second bearing disposed between the hub member and the intermediate drive member; and
wherein the force sensor unit is disposed on the sensor shaft axially between the first bearing and the second bearing.

* * * * *